United States Patent [19]

Meynardi

[11] Patent Number: 4,737,191

[45] Date of Patent: Apr. 12, 1988

[54] PROCESS FOR MANUFACTURING HYDRAULIC BINDERS

[75] Inventor: Guy Meynardi, Dole, France

[73] Assignee: Ciments de Champagnole, Dole, France

[21] Appl. No.: 744,609

[22] Filed: Jun. 14, 1985

[30] Foreign Application Priority Data

Jun. 25, 1984 [FR] France ................. 84 10186

[51] Int. Cl.⁴ .................................. C04B 7/00
[52] U.S. Cl. ........................... 106/85; 106/89; 106/100; 106/103
[58] Field of Search ............... 106/89, 100, 103, 85

[56] References Cited

U.S. PATENT DOCUMENTS

| | | | |
|---|---|---|---|
| 1,784,840 | 12/1930 | La Forge ................ | 106/100 |
| 4,102,700 | 7/1978 | Kwech et al. .......... | 106/100 |
| 4,137,089 | 1/1979 | Arnould et al. ........ | 106/100 |

FOREIGN PATENT DOCUMENTS

| | | | |
|---|---|---|---|
| 1438 | of 1915 | United Kingdom ........ | 106/100 |
| 447722 | 5/1936 | United Kingdom ........ | 106/100 |

*Primary Examiner*—Steven Capella
*Attorney, Agent, or Firm*—Dowell & Dowell

[57] ABSTRACT

The invention has for its object: a fabrication process of hydraulic binders, characterized in that it consists:

I. in preparing an active product according to a method comprising the following steps:
 selection of a raw material containing intimately mixed clay phases and calcium carbonate;
 heat treatment of said material at a temperature between 700 and 900 degrees C.;
 application during the heat treatment of a partial pressure of carbonic gas opposing the thermal dissociation of the calcium carbonate beyond that which combines with the clay phase;
 achievement of a simultaneous activation of the clay phases by dehydroxylation (pozzolanic activation) and of the clay-lime combinations with potential hydraulic properties, without formation of free lime;

II. in mixing up to 95% of the active product so obtained with the corresponding complement to 100% of an activating product generating calcium hydroxyde.

13 Claims, No Drawings

PROCESS FOR MANUFACTURING HYDRAULIC BINDERS

The object of this invention is an improved process for the production of hydraulic binders, as well as the products obtained by its application.

In order to make this document easily readable, we give hereunder some definitions of the words used.

Raw meal: mixture of limestone (calcium carbonate) and clay (silica, aluminium and iron oxide) in well defined proportions, crushed, dried and homogenized in order to produce artificial Portland cement clinker.

Clinker: raw meal after heat treatment in a cement kiln at 1450 degrees C., containing essentially lime aluminates, aluminoferrites and lime silicates. Clinker is a hydraulic product that produces standardized artificial Portland cement when finely crushed and blended with a few percent of gypsum.

Gypsum adding: operation by which a few percents of gypsum ($CaSO_4\ 2H_2O$) are added on crushing the clinker, so as to regularize the setting of the cement.

Pozzolana: clay product that has been submitted to dehydroxylation by heat treatment, which gives it the ability to combine with lime during the hardening process of artificial Portland cement.

It is worth noting that before the year 1960 the components of the raw meal were mixed in the form of water paste (containing 30 to 35% of water). The latter had to be dried by evaporation before burning the raw meal, so that the energy used up for producing clinker was then in the order of 1500 therms per ton produced.

Since then, the production process has been improved, in such a manner that the ability to obtain an excellent mixture of dry powders made it possible to improve considerably the thermal balance by favoring dry clinkerization. Still later on, improvements in the heat exchange conditions of the cement kilns provided for a further reduction of the energy consumption down to 800 therms per ton of clinker.

This heat consumption represents approximately the practical limit in conventional clinker production, i.e. it has not been possible to reduce it to a lower value up to now.

It can consequently be stated that the production of cement requires important amounts of energy. For instance, the French cement industry ranks second as to energy consumption.

It is therefore easy to understand that all cement producers are permanently trying to cut the energy consumption in order to lower their production cost.

It should be added that the cement industry is still a very polluting one in spite of the dry techniques, due to the high operating temperatures of the kilns. Under these conditions, it is necessary to provide important equipment for environmental protection, which results in an additional factor of cost increase of the hydraulic binders presently produced.

The improvements covered by the present invention tend to remedy the inconveniences mentioned and to propose a new fabrication process for hydraulic binders, by operating at lower temperatures, which results on the one hand in cutting polluting emissions due to the fact that the system operates at 900 degrees C., and on the other hand in saving important quantities of energy.

Furthermore, the process according to the invention makes it possible to obtain hydraulic binders of better quality than those produced by conventional methods.

The fabrication process according to the invention includes the steps of

I. first preparing an active product according to method comprising the following steps:
  selection of a raw material containing intimately mixed clay phases and calcium carbonate;
  heat treatment of said material at a temperature between 700 and 900 degrees C.;
  application during the heat treatment of a partial pressure of carbonic gas opposing the thermal dissociation of the calcium carbonate beyond that which combines with the clay phases;
  achievement of a simultaneous activation of the clay phases by dehydroxylation (pozzolanic activation) and of the clay-lime combinations with potential hydraulic properties, without formation of free lime;

II. mixing up to 95% of the active product so obtained with the corresponding complement to 100% of an activating product.

The prior art chemical production of hydraulic binders such as cements is based on the complete thermal dissociation of the calcium carbonate present in the raw meal in order to allow the calcium oxide freed to react at high temperature (1200 to 1450 degrees C.) with the iron, aluminum and silicon oxides and to build the hydraulic phases of the clinker.

According to the invention, complete decarbonation of the calcium carbonate is prevented by limiting decarbonation to only that calcium carbonate which goes directly into the formation of active clay-lime combinations.

It is known that thermal dissociation of the calcium carbonate is an equilibrium reaction, the temperature of which depends on the partial pressure of carbonic gas prevailing inside the reaction enclosure. For a pressure of one atmosphere, this temperaure is in the order of 920 degrees C. According to the invention, it has become possible to heat between 700 and 900 degrees without complete decomposition of the calcium carbonate, due to the maintenance of an appropriate pressure of carbonic gas.

When calcium carbonate is in presence of sufficiently reactive iron, aluminum and silicon oxides (for instance those produced by thermal activation of the clays), under these conditions and at such a temperature that formation reactions of simple or complex lime combinations become possible thermo-dynamically, only the calcium carbonate going into combination decomposes.

On the other hand, the temperature range mentioned (700 to 900 degrees C.) corresponds to that of more or less complete dehydroxylation of a large number of hydrates and clays with formation of very active oxides. As we know, this controled dehydroxylation is the base used for the production of artificial pozzolanes. In short, the present invention makes it possible to obtain, simultaneously, activation reactions of the hydrated phases and formation reactions of clay-lime combinations, from a suitable initial material treated at a temperature which is related to the partial pressure of carbonic gas opposing excess dissociation of the calcium carbonate into free lime.

The compounds formed under the conditions described (active oxides and clay-lime combinations) are characterized by a very poorly organized structure, which in fact gives them their reactivity. On the other hand, as the lime compounds never come in presence of calcium oxide in excess during their formation, they have usually a very low lime saturation rate. As a consequence, the active product considered can fully develop its hydraulic properties only when in presence of a generator of calcium hydroxide such as clinker or any other activating product capable of a similar physico-chemical action (a quantity of approx. 5% of such a product grants already an appreciable action). In the same manner, the determination of the quantity of gypsum to be added to each mixture gives the best results.

Operation at a relatively low temperature while avoiding excess dissociation of the calcium carbonate that has not reacted with clays makes it possible to obtain a profitable thermal balance, because thermal dissociation of the calcium carbonate accounts for the major part of the energy consumption. Moreover, atmospheric pollution is considerably reduced. As a matter of fact, the production of one ton of active product requires only approx. 400 therms.

The heat treatment mentioned above is advantageously performed in a flame kiln, using a type of fuel and settings assuring the maximum carbonic gas content possible.

Use can also be made of a fluidized bed kiln operating in a suitable atmosphere.

The chemical control of the heat treatment of the product is readily performed by determining the fire loss, the content is carbonic gas, free lime and insoluble residues, in the standardized manner.

The choice of the material to be treated is based on the following considerations:

The product to be treated should offer the most intimate contact between the hydrated phases and the calcium carbonate. It can be either of natural origin (more or less calcareous clays, marls, some shales), or of artificial origin (mixture of finely divided materials, residues of co-precipitation, as in water treating).

In certain cases, chemical mineralizing agents may be added in order to improve the reactions.

As the reactions occur in the solid state, reciprocal dilution of the main components (hydrated and carbonated phases) should be prevented.

For instance, a hydraulic binder containing 80% of a product obtained according to the invention and 20% of a conventional clinker with optimal addition of gypsum has shown following ISO mortar strength values:

|  | Tensile-bending strength | Compressive strength |
| --- | --- | --- |
| 2 days | 2,55 Mpa | 11 Mpa |
| 7 days | 5,60 | 31 |
| 28 days | 7,80 | 48 |
| 3 months | 8,40 | 53,60 |
| 6 months | 8,70 | 55,60 |

A hydraulic binder of very good quality has been produced in this manner. Its use means a substantial saving of energy and an appreciable reduction of pollution.

I claim:

1. A process for the preparation of hydraulic binders, which comprises:
   I. preparing an active product by the following steps:
      selection of a raw material containing intimately mixed clay phases and calcium carbonate;
      heat treatment of said material at a temperature between 700 and 900 degrees C.;
      application during the heat treatment of said material of a sufficient partial pressure of carbonic gas to oppose the thermal dissociation of the calcium carbonate in excess of that which directly combines with the clay phases;
      whereby there is obtained simultaneously both activation of the clay phases by dehydroxylation (pozzolanic activation) and reaction of said dehydroxylated clay phases directly with a portion of the calcium carbonate to form lime combinations with potential hydraulic properties, without formation of free lime;
   II mixing the active product so obtained with an activating produce to fully develop the hydraulic properties of the active product, wherein the amount of active product in the mixture does not exceed 95%.

2. Process according to claim 1, in which the activating product is conventional clinker.

3. The hydraulic binder obtained by applying the process according to claim 1.

4. The Hydraulic Binder of claim 3 in which said activating product includes conventional clinker.

5. The process according to claim 1 in which the activating product generates calcium hydroxide.

6. The Hydraulic Binder obtained by applying the process according to claim 5.

7. A process for preparing hydraulic binders from an intimate mixture of raw material containing clay phases and calcium carbonate comprising the steps of:
   (a) Heating the intimate mixture of clay phases and calcium carbonate at temperatures of between 700°-900° C. within a heating zone to thereby activate the clay phases by dehydroxylation and reaction of said dehydroxylated clay phases with portions of the calcium carbonate in order to form lime combinations having potential hydraulic properties;
   (b) Simultaneously with the heating of the mixture of clay phases and calcium carbonate introducing carbonic gas into the heating zone in order to create a partial pressure of carbonic gas therein to oppose the thermal dissociation of portions of the calcium carbonate which are present in the mixture in excess of an amount which is directly combined with the dehydroxylated clay phases so as to thereby prevent the formation of any free lime;
   (c) Thereafter developing the hydraulic properties of the active product by mixing up to 95% of said active product with a hydraulic activating product to thereby form the hydraulic binder.

8. The process of claim 7 in which said activating product generates calcium hydroxide.

9. The process of claim 7 in which said activating product includes conventional clinkers.

10. A hydraulic binder composition comprising an active product having hydraulic potential and a hydraulic activating product for chemically activating the hydraulic potential of the active product, said active product including an intimate mixture of clay phases and calcium carbonate which have been heated in a carbonic gas atmosphere at temperatures of between 700°-900° C. so as to simultaneously form compounds containing dehydroxylated clay phases which chemically react with a first portion of the calcium carbonate to form poorly structured lime combinations and a second portion of unreacted calcium carbonate, said activating product being present in an amount sufficient to develop the hydraulic properties of said active product and said active product generally not exceeding 95% of the total binder composition.

11. The hydraulic binder of claim 10 in which said activating product includes conventional clinkers.

12. The hydraulic binder of claim 11 including minor amounts of gypsum.

13. The hydraulic binder of claim 10 in which said activating product generates calcium hydroxide.

* * * * *